US011687726B1

(12) United States Patent
Fung et al.

(10) Patent No.: US 11,687,726 B1
(45) Date of Patent: *Jun. 27, 2023

(54) SYSTEMS AND METHODS INVOLVING SEMANTIC DETERMINATION OF JOB TITLES

(71) Applicant: 8x8, Inc., Campbell, CA (US)

(72) Inventors: Solomon Fung, San Mateo, CA (US); Soumyadeb Mitra, San Jose, CA (US); Abhishek Kashyap, San Jose, CA (US); Arunim Samat, San Francisco, CA (US); Venkat Nagaswamy, San Francisco, CA (US); Justin Driemeyer, Driemeyer, CA (US)

(73) Assignee: 8x8, Inc., Campbell, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/108,593

(22) Filed: Dec. 1, 2020

Related U.S. Application Data

(63) Continuation of application No. 15/968,751, filed on May 2, 2018, now Pat. No. 10,860,803, which is a (Continued)

(51) Int. Cl.
*G06F 40/30* (2020.01)
*G06Q 30/0241* (2023.01)
(Continued)

(52) U.S. Cl.
CPC ............ *G06F 40/30* (2020.01); *G06F 16/951* (2019.01); *G06F 18/21355* (2023.01);
(Continued)

(58) Field of Classification Search
CPC ........ G06F 40/30; G06F 16/951; G06F 16/95; G06F 16/243; G06F 16/24539;
(Continued)

(56) References Cited

U.S. PATENT DOCUMENTS 6,917,952 B1   7/2005  Dailey et al.
7,555,441 B2   6/2009  Crow et al.
(Continued)

OTHER PUBLICATIONS

Wikipedia. Cosine similarity, 6 pages (printed Aug. 21, 2019).

*Primary Examiner* — Abdelali Serrou
(74) *Attorney, Agent, or Firm* — Crawford Maunu PLLC

(57) ABSTRACT

In one example, a computer-based system determines a relationship between a first job and a second job at one or more companies, by using a title data store, a training module, and a prediction module, wherein the title data store accepts job-related information characterizing at least one job-related position that includes at least one of title, corporate entity, job description, and job-related interest data. The training module accepts input data from the title data store, calculates or generates a set of coefficients and a set of job-related vectors from the input data, and stores the coefficients into a database. The prediction module may accept: a first set of data including at least one of a first title, a first corporate designation data, a second set of data including at least one of a second title and a second (Continued)

corporate designation data, and the coefficients from the training module; and then a similarity between the first set of data and the second set of data may be calculated.

20 Claims, 5 Drawing Sheets

Related U.S. Application Data continuation of application No. 62/502,707, filed on May 7, 2017.

(51) Int. Cl.
| | | |
|---|---|---|
| *G06Q 10/067* | (2023.01) | |
| *G06F 16/951* | (2019.01) | |
| *G06Q 10/105* | (2023.01) | |
| *G06F 18/2135* | (2023.01) | |
| *G06N 3/044* | (2023.01) | |
| *G06N 3/045* | (2023.01) | |
| *G06N 3/084* | (2023.01) | |
| *G06N 3/088* | (2023.01) | |
| *G06N 5/04* | (2023.01) | |

(52) U.S. Cl.
CPC ............. *G06N 3/044* (2023.01); *G06N 3/045* (2023.01); *G06Q 10/067* (2013.01); *G06Q 10/105* (2013.01); *G06Q 30/0276* (2013.01); *G06N 3/084* (2013.01); *G06N 3/088* (2013.01); *G06N 5/04* (2013.01)

(58) Field of Classification Search
CPC ........... G06F 16/24578; G06F 16/9535; G06F 16/211; G06F 16/289; G06F 40/284; G06F 18/21355; G06F 16/2457; G06F 16/248; G06F 16/2365; G06F 16/3344; G06F 16/958; G06F 16/258; G06N 3/0445; G06N 3/0454; G06N 5/04; G06N 3/084; G06N 3/088; G06N 3/0481; G06N 7/005; G06K 9/6248; G06Q 10/105; G06Q 30/0276; G06Q 10/067; G06Q 10/1053; G06Q 50/01; G06Q 10/107; G06Q 10/10; G06Q 10/00
See application file for complete search history.

(56) References Cited

U.S. PATENT DOCUMENTS

| | | |
|---|---|---|
| 8,244,551 B1 | 8/2012 | Mund |
| 8,429,103 B1 | 4/2013 | Aradhye et al. |
| 9,342,592 B2 | 5/2016 | Giverts et al. |
| 9,558,271 B1 | 1/2017 | Sathe et al. |
| 10,043,157 B2 * | 8/2018 | Vembunarayan ... G06F 16/9535 |
| 10,061,766 B2 * | 8/2018 | Bettersworth .......... G06F 40/30 |
| 10,346,444 B1 | 7/2019 | Heitman et al. |
| 10,387,837 B1 * | 8/2019 | Mund .................. G06Q 10/105 |
| 10,515,623 B1 | 12/2019 | Grizzel |
| 10,536,353 B2 * | 1/2020 | Gupta .................... G06F 16/951 |
| 10,607,152 B2 * | 3/2020 | Snyder .................... H04L 51/32 |
| 10,769,539 B2 * | 9/2020 | Beller ................. G06F 16/9024 |
| 11,164,136 B2 * | 11/2021 | Chee ................ G06Q 10/06398 |
| 2001/0034630 A1 | 10/2001 | Mayer et al. |
| 2002/0042786 A1 | 4/2002 | Scarborough et al. |
| 2003/0120630 A1 | 6/2003 | Tunkelang |
| 2005/0080657 A1 | 4/2005 | Crow et al. |
| 2012/0254143 A1 | 10/2012 | Varma et al. |
| 2015/0161567 A1 | 6/2015 | Mondal et al. |
| 2015/0317610 A1 | 11/2015 | Rao et al. |
| 2016/0048595 A1 * | 2/2016 | VanBlon ............... H04L 67/306 707/754 |
| 2016/0092838 A1 * | 3/2016 | Hardtke ................. G06F 16/951 705/319 |
| 2016/0125360 A1 * | 5/2016 | Ali ...................... G06Q 10/1053 705/321 |
| 2016/0132830 A1 * | 5/2016 | Zhang ............... G06F 16/24578 705/320 |
| 2016/0196619 A1 | 7/2016 | Merhav et al. |
| 2016/0378865 A1 | 12/2016 | Makhani et al. |
| 2017/0032326 A1 | 2/2017 | Zhao |
| 2018/0101893 A1 * | 4/2018 | Dagan ................ G06Q 30/0641 |
| 2018/0107982 A1 | 4/2018 | Arya et al. |
| 2018/0121879 A1 * | 5/2018 | Zhang ................. G06F 16/3344 |
| 2018/0165696 A1 | 6/2018 | Bessen et al. |
| 2018/0173802 A1 | 6/2018 | Grover et al. |
| 2018/0232562 A1 | 8/2018 | Cambor |
| 2018/0247214 A1 | 8/2018 | Ganjoo |
| 2019/0163737 A1 | 5/2019 | Zhou et al. |
| 2019/0362233 A1 | 11/2019 | Aizawa et al. |

* cited by examiner

SYSTEMS AND METHODS INVOLVING SEMANTIC DETERMINATION OF JOB TITLES

BACKGROUND

The present disclosure generally relates to the analysis of corporate data to determine the relationship of a job title to the actual work that a person does, thus relate job titles within a company and across companies with each other.

Companies give people titles which have little meaning between companies. For instance, a vice-president would be a high-level manager in many consumer companies, while in a bank it seems like everyone about a teller is given the title of vice-president.

When trying to determine whether or not someone fits into a specific category of skilled worker, a human resource program might scan a resume and/or job description for keywords, but keywords alone do not resolve this as different job description may use different words to mean roughly the same thing.

What is needed is a system for determining the semantic relationship of job titles within a company by comparing the skills associated with an individual's resume or job description within and across companies.

SUMMARY

In certain non-limiting examples, systems and related methods are described with the system to accept corporate and employee data from one or more company-related entities (e.g., companies) and calculate the semantic relationship of one or more job titles to each other.

Other more specific non-limiting examples are directed to a computer-based system determines a relationship between a first job and a second job at one or more companies, by using a title data store, a training module, and a prediction module, wherein the title data store accepts job-related information characterizing at least one job-related position that includes at least one of title, corporate entity, job description, and job-related interest data. The training module accepts input data from the title data store, calculates or generates a set of coefficients and a set of job-related vectors from the input data, and stores the coefficients into a database. The prediction module may accept: a first set of data including at least one of a first title, a first corporate designation data, a second set of data including at least one of a second title and a second corporate designation data, and the coefficients from the training module; and then a similarity between the first set of data and the second set of data may be calculated.

In yet further examples building on the above, the job-related vectors in the set of job-related vectors may be based on an association of words within the input data with a weight that is adjusted based on backpropagation as a function of a relationship between said at least one job-related vector and a known job-related vector.

DETAILED DESCRIPTION OF EXAMPLE EMBODIMENTS

Figure 1:
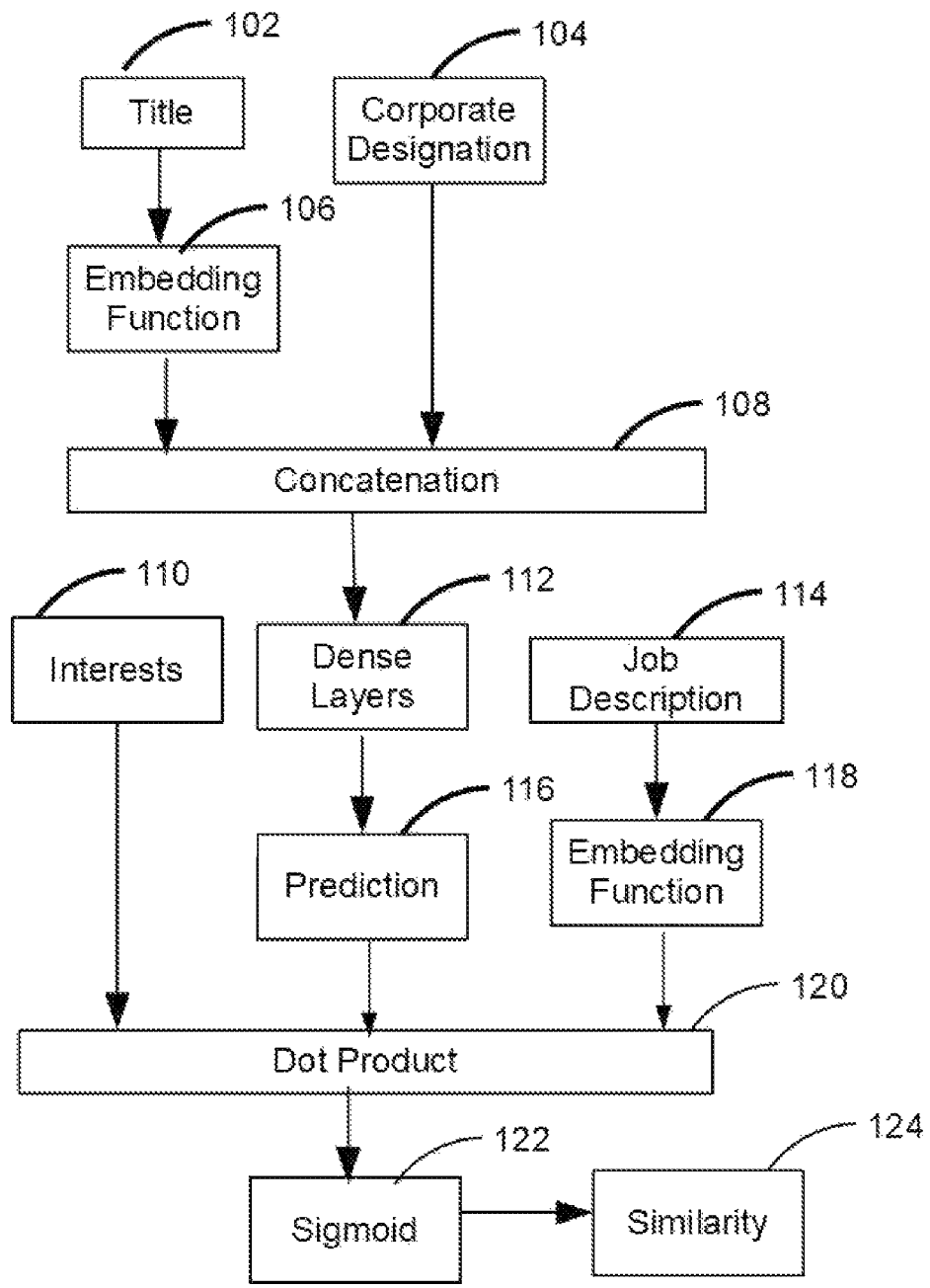
FIG. 1 shows one or more embodiments of a workflow of how the system is trained.

FIG. 1 shows one or more embodiments of the model used to train the classifier. The title 102, a corporate designator associating the title with a specific corporate entity 104, and the description information are input to the model. The description is put through an embedding function 118 before being input into the classifier. In other embodiments, a type of recurrent neural network classifier called LSTM is used as the embedding function 118.

Figure 4:
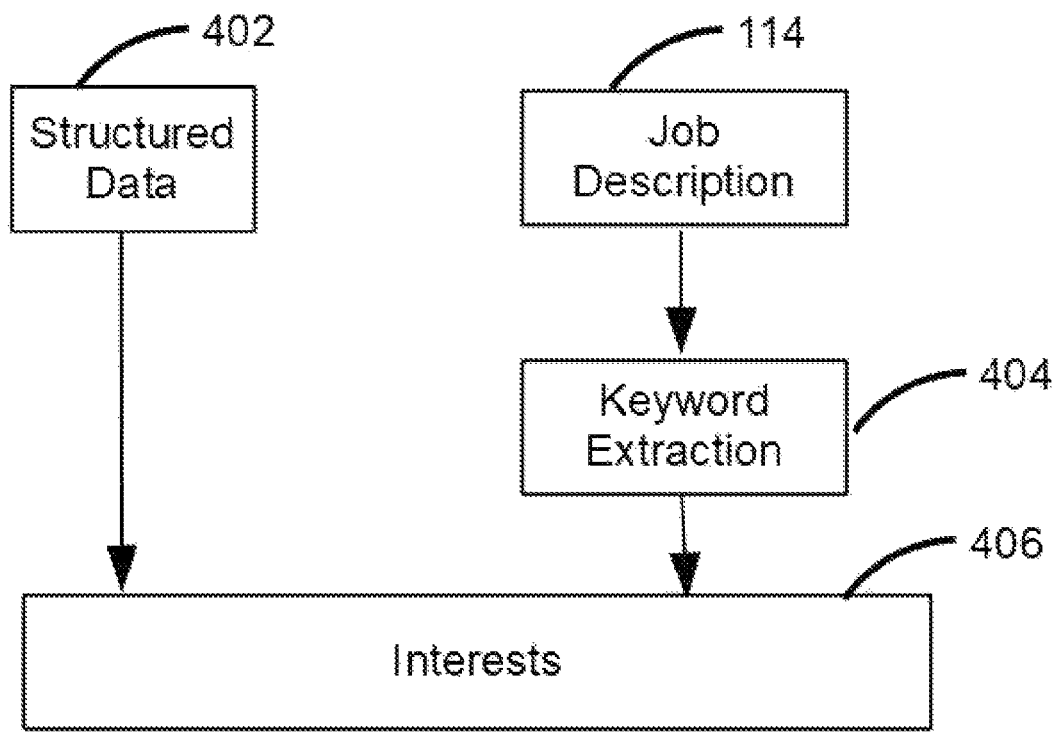
FIG. 4 shows one or more embodiments of how the interests are generated.

Job title, description and employee profile information is collected from one or more companies. A title vector is created which defines how that title 102 is related to each specific corporate designation 104. Job description information 114 such as job description and employee profile information is put through a training process as shown in FIG. 4, such that the words within the description and employee information are associated with a weight. As the relationship of the title to the actual role varies based on the corporate designation, the title information after the embedding function 106 and the corporate designation 104 are concatenated 108 as a single vector for further processing. In one or more embodiments, the weighted values are passed through a recurrent neural network classifier 112 with the resultant prediction 116 compared to the known title vector. In other embodiments, a type of recurrent neural network classifier called LSTM is used as the embedding function 106. In one or more embodiments, the weights are changed using backpropagation and the classifier is run again to obtain a good fit. This process is repeated for all of the provided title vector and description information to obtain the best possible fit given the input training data. To determine asimilarity value for a specific role within a corporate entity, interests associated with the job title 110 and the embedding function output 118 associated with the job description information 114 are passed through a dot product 120. The output of the dot product 120 is passed through a sigmoid function 122 to produce a similarity value 124.

Figure 2:
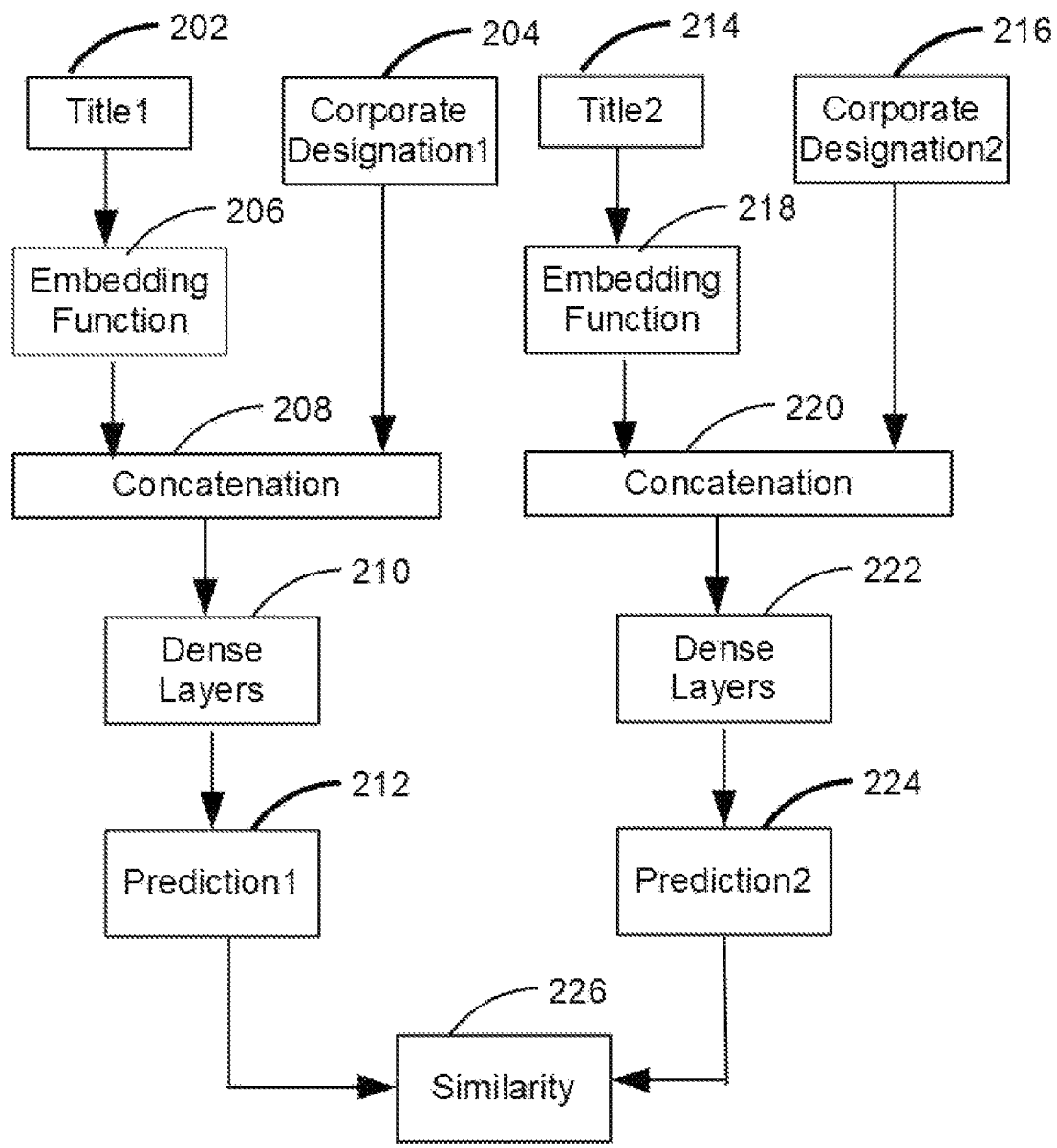
FIG. 2 shows one or more embodiments of how the system is used to predict the relationships between job titles.

Once the system is trained, it can be used against other sets of title vector and description information pairs as shown in FIG. 2. The goal here is to use the predictor to see if the job titles are semantically similar based on the predictions.

FIG. 2 shows the system needed to compare two descriptions to see if they are associated with the same or similar roles at companies. The first title 202 is put through a first embedding function 206. In one or more embodiments, a type of recurrent neural network classifier called LSTM (Long Short Term Memory) is used as the first embedding function 206. The output of the first embedding function 206 is concatenated 208 with the first corporate designation 204 to produce a single output vector. A first classifier 210 trained on weights associated with the trained system 110 is used to predict the role 212 associated with the first title 202. In one or more embodiments, the first classifier 210 is a sequence of dense layers with pooling. A second title to compare it with 214 is put through a second embedding function 218. The output of the second embedding function 218 is concatenated with the second corporate designation associated with the second title 216. The concatenation layer 220 is followed by a second classifier 222 to predict what role it is associated with 224. In one or more embodiments, a type of recurrent neural network classifier called LSTM is used as the second embedding function 218. The two predictions are compared using a similarity function 226. In one or more embodiments, the second classifier 222 is a sequence of dense layers with pooling. In one or more embodiments, this similarity function 226 is the Euclidian distance between the two prediction vectors. In other embodiments, it is the cosine similarity between the two prediction vectors. Other information regarding cosine similarity may be found at Wikipedia® as entered on May 4, 2017.

Figure 3:
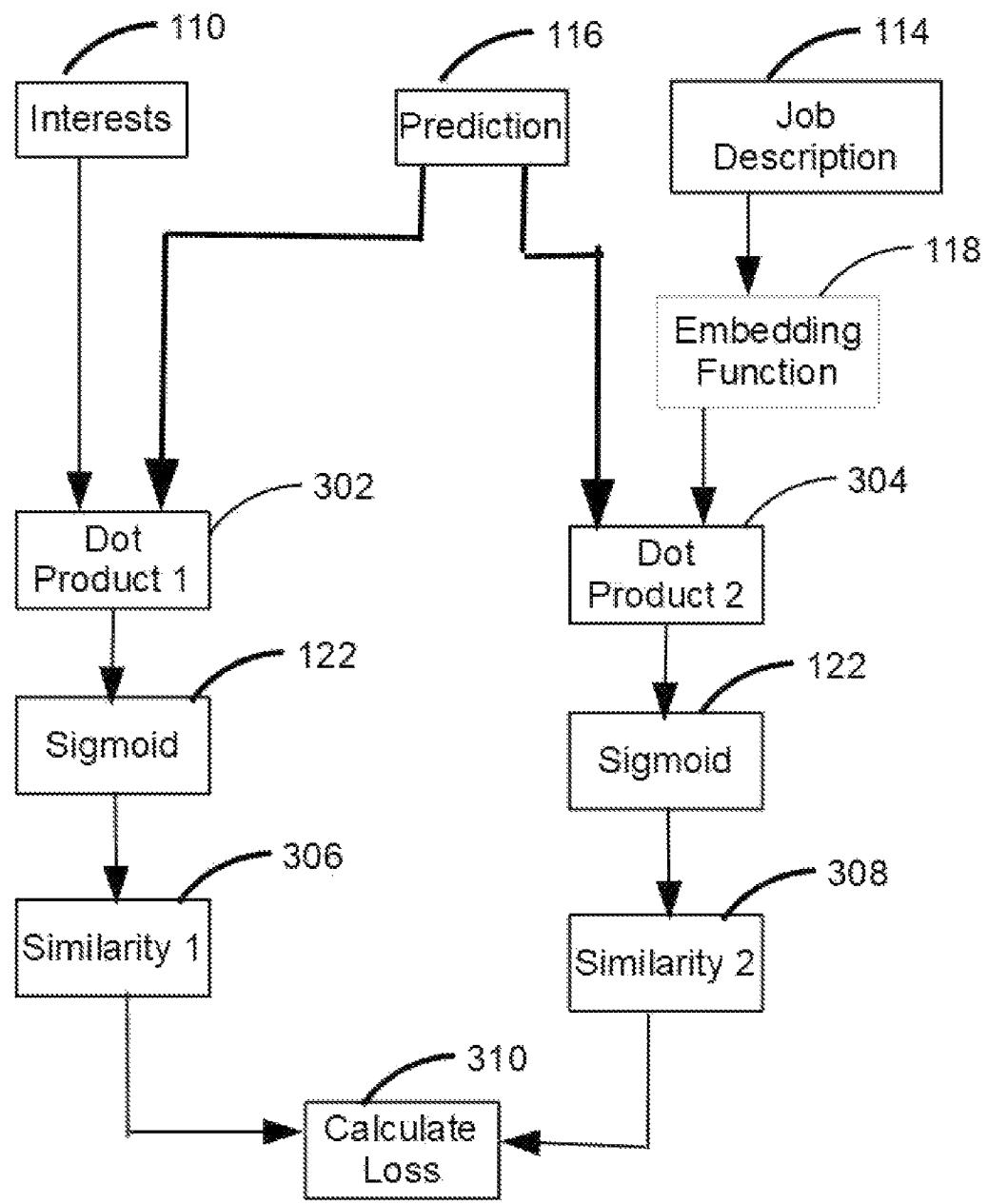
FIG. 3 shows one or more embodiments of how the system trains the weights for the interests and job descriptions based on the predictions of the job titles.

In one or more embodiments, we can improve the weights around interest and job description data by leveraging the prediction output of the model 116. As shown in FIG. 3, a first dot product 302 of the interests 110 and the prediction 116 is put through a sigmoid function 122 to produce a first similarity vector 306. A second dot product 304 of the prediction 116 and embedding function output 118 of the job description data 118 is put through a sigmoid function 122 to produce a second similarity vector 308. The weighted sum of the two similarity values is the total prediction loss value 310 the network will minimize during training using backpropagation to adjust the weights.

Figure 5:
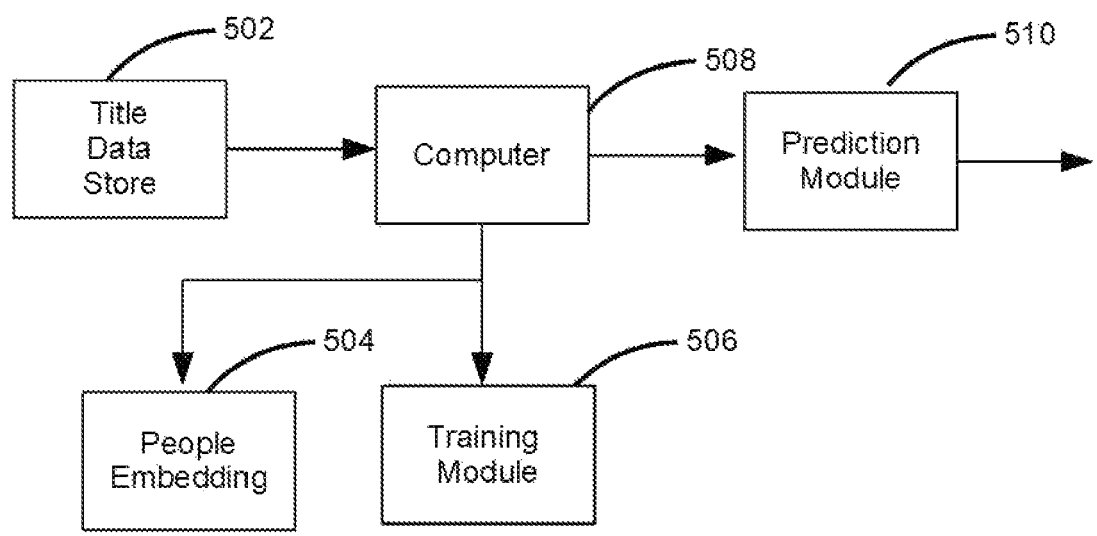
FIG. 5 shows one or more embodiments of the physical system associated with the instant disclosure.

FIG. 5 shows one or more embodiments of the physical system. A computer 508 is coupled to a title data store module 502. The title data store module 502 is configured to accept title, corporate entity, job description and interest data. In one or more embodiments, the Training Module 506 is coupled to the computer 508, the Training Module configured to accept data from the Title Data Store 502 and generate the prediction model parameters as shown in FIG. 1, along with the interests and job description weights as shown in FIG. 3.

The Prediction Module 510, coupled to the computer 508, is configured to accept prediction model parameters from the Training Module 506 along with title data associated with two roles and calculate a similarity value, as shown in FIG. 2. In one or more specific embodiments, a People Embedding Module 504 is coupled to the computer, configured to accept and store the output of the concatenation stage 108 and associate it with a specific title at a specific corporate entity. In one or more embodiments, the People Embedding Module accepts requests to return similar titles based on a given threshold from a measure of distance from a given title at a corporate entity. In one or more embodiments, that distance is the Euclidian distance. In other embodiments, that distance is the cosine similarity function. In one or more embodiments, the People Embedding Module accepts requests to compare two titles associated with the same or different corporate entities, and returns the difference.

FIG. 4 shows a flow for production of the interests data. Structured data sources 402 such as employee profile information is parsed to find interest values. Job description data 114 is passed through a keyword extractor 404 to produce interest data. The concatenation of the two produces the interest data used in the model 406.

What is claimed is:

1. A computer-implemented method for determining a relationship between a first job and a second job at different companies, the method comprising:
   using a computer having neural network classifier circuitry to process weight associated with words from among a first set of data and a second set of data via a recurrent network classification, a title data store that includes memory circuitry and that is communicatively coupled to the computer, a training module communicatively coupled to the computer, and a prediction module also communicatively coupled to the computer; wherein the title data store is to accept job-related information characterizing at least one job-related position which includes at least one of title, corporate entity, job description, and job-related interest data, and wherein the training module includes circuitry, and instructions that, when executed by the computer, causes the computer to accept input data from the title data store, to calculate or generate a set of coefficients and a set of job-related vectors from the input data, and store the set of coefficients into a database; and
   accepting, by the prediction module:
      the first set of data including at least one of a first title and a first corporate designation data,
      the second set of data including at least one of a second title and a second corporate designation data, and
      the set of coefficients from the training module, wherein the prediction module includes circuitry and instructions that, when executed by the computer, calculates a similarity between the first title and the second title; and
   calculating, via the computer, a mathematical-distance similarity between the first set of data and the second set of data, wherein at least one of the job-related vectors in the set of job-related vectors is based on an association of words within the input data with a weight that is adjusted using the neural network classifier circuitry based on backpropagation as a function of a relationship between said at least one of the job-related vectors and a known job-related vector;
   providing a determination of a dot product, by passing the dot product through an activation function of the computer to produce a similarity value, for interests associated with the first title and data associated with the job description and a calculation of the similarity between the first title and the second title; and
   producing, via an output of the computer and based at least in part on the mathematical-distance similarity between the first set of data and the second set of data, similar-relationship data between the first job and the second job at the different companies.

2. The method of claim 1, further comprising:
   accepting title-related data from an external data source,
   calculating a set of coefficients from or based on said title-related data,
   processing a title against said set of coefficients, and
   returning a set of similar titles.

3. The method of claim 1, wherein the training module generates the set of coefficients by creating title vectors based on the input data, each title vector being indicative of a relationship between the title and the corporate designation data.

4. The method of claim 3, wherein the training module concatenates each title vector with a vector representing the corporate designation data to generate a single concatenated vector.

5. The method of claim 3, wherein the training module generates the set of coefficients by, for each title vector:
   associating words within the job description in the input data with a weight,
   comparing the title vector to a known title vector, and
   adjusting the weight associated with the words via backpropagation, based on the comparing.

6. The method of claim 1, further including calculating the similarity between the first title and the second title by determining whether the first title and the second title are semantically similar based on the first title, the second title, and the set of coefficients.

7. The method of claim 1, further including calculating the similarity between the first title and the second title by:
for each of the first and second titles,
embedding the title using an embedding function and concatenating an output of the embedding function and the corporate designation data associated with the title, therein producing a single output vector for each title;
predicting a role associated with the title using a classifier; and
comparing the predicted roles for the first and second titles using a similarity function.

8. The method of claim 7, wherein comparing the predicted roles for the first and second titles using a similarity function includes determining a Euclidian distance between vectors representing the predictions.

9. The method of claim 7, wherein comparing the predicted roles for the first and second titles using a similarity function includes determining a cosine similarity between the vectors representing the predictions.

10. The method of claim 1, further including calculating the similarity between the first title and multiple titles, and to return a set of titles from the multiple titles that match the first title.

11. The method of claim 1, wherein the mathematical-distance similarity, between the first set of data and the second set of data, is based on a Euclidean distance measurement or a cosine-similarity function.

12. The method of claim 1, wherein the neural network classifier circuitry trains by adjusting weights associated with words to predict a role associated with the first title.

13. The method of claim 12, wherein the weights are changed by the neural network classifier circuitry, via backpropagation to predict the role.

14. A computer-based system for determining a relationship between a first job and a second job at different companies, the computer-based system comprising:
a computer having neural network classifier circuitry;
a title data store circuit communicatively coupled to the computer and configured to accept job-related information characterizing at least one job-related position, said job-related information characterizing at least one job-related position including one of or a combination of: title, corporate entity, job description, and job-related interest data;
a training module, including circuitry, communicatively coupled to the computer and configured to accept input data from the title data store circuit, to calculate or generate a set of coefficients and a set of job-related vectors from the input data, and store the set of coefficients into a database; and
a prediction module, coupled to the computer, configured to accept a first set of data including one or a combination of a first title and a first corporate designation data, and to accept a second set of data including one or a combination of a second title and a second corporate designation data, the prediction module being further configured to accept the set of coefficients from the training module and calculate a similarity between the first set of data and the second set of data, wherein at least one of the job-related vectors in the set of job-related vectors is based on an association of words within the input data with a weight that is adjusted using the neural network classifier circuitry based on backpropagation as a function of a relationship between said at least one of the job-related vectors and a known job-related vector, and the computer is to produce an output, based at least in part on the backpropagation as a function of a relationship between said at least one of the job-related vectors and a known job-related vector, indicative of similar-relationship data between the first job and the second job at the different companies.

15. The system of claim 14, wherein:
the computer includes circuitry;
the title data store circuit includes memory circuitry that stores at least two of: the title, corporate entity, job description and the job-related interest data;
the training module includes circuitry and instructions that, when executed by the computer, is to calculate the set of coefficients and store the set of coefficients in the database; and
the prediction module includes circuitry and instructions that, when executed by the computer, is to calculate the similarity between the first title and the second title.

16. The system of claim 14, wherein the computer, title data store circuit, training module and prediction module are to be used to calculate the set of coefficients by:
creating title vectors based on the input data, each title vector being indicative of a relationship between the title and corporate designation data, and
generate a single concatenated vector represented by the set of coefficients by concatenating each title vector with a vector representing that title vector's corporate designation data.

17. The system of claim 16, wherein using the computer, title data store circuit, training module and prediction module are to provide a calculation for providing the set of coefficients, for each title vector by:
associating words within the job description in the input data with a weight,
comparing a the title vector to a known title vector, and
adjusting the weight associated with the words via backpropagation, based on the comparing.

18. The system of claim 14, wherein said title is to be processed against said set of coefficients by determining whether an accepted title is semantically similar to titles in the title data store circuit based on the titles and the set of coefficients.

19. The system of claim 14, wherein
said title against is to be processed relative to said set of coefficients by determining a dot product for interests associated with an accepted title and data associated with a job description for the accepted title, and passing the dot product through a sigmoid function to produce a similarity value.

20. The method of claim 1, wherein the neural network classifier circuitry processes weights associated with words, from among the first set of data and the second set of data, via a recurrent network classification.

* * * * *